United States Patent [19]

Burch et al.

[11] Patent Number: 5,352,153

[45] Date of Patent: Oct. 4, 1994

[54] IMAGING SYSTEM FOR USE IN PROCESSING TRANSVERSELY CUT FISH BODY SECTIONS

[75] Inventors: Ronald H. Burch, River Ridge; Mark E. Sutton, Kenner, both of La.; Bernard Bretagnolle, Grenoble, France; Somsak S. Rodboon, Kenner, La.; Warren E. Cancienne, River Ridge, La.; Soumitra Sengupta, New Orleans, La.

[73] Assignee: The Laitram Corporation, Harahan, La.

[21] Appl. No.: 90,819

[22] Filed: Jul. 13, 1993

[51] Int. Cl.[5] ............................ A22C 25/18
[52] U.S. Cl. .................... 452/157; 452/170; 83/365
[58] Field of Search .............. 452/157, 149, 150, 170; 83/360, 361, 364, 365

[56] References Cited

U.S. PATENT DOCUMENTS

| Re. 33,917 | 5/1992 | Lapeyre et al. | 452/158 |
|---|---|---|---|
| 3,089,775 | 1/1960 | Lindall | 99/107 |
| 3,593,370 | 7/1971 | Lapeyre | 17/52 |
| 3,594,191 | 2/1969 | Lapeyre | 99/111 |
| 3,675,273 | 7/1972 | Vidjak | 17/61 |
| 3,800,363 | 4/1974 | Lapeyre | 17/52 |
| 3,978,748 | 9/1976 | Leslie et al. | 83/53 |
| 4,020,528 | 5/1977 | Lindbladh et al. | 17/50 |
| 4,217,679 | 8/1980 | Gordon | 17/46 |
| 4,520,702 | 6/1985 | Davis et al. | 83/71 |
| 4,557,019 | 12/1985 | Van Devanter et al. | 17/52 |
| 4,651,476 | 3/1987 | Marx et al. | 51/410 |
| 4,669,229 | 6/1987 | Ehlbeck | 51/410 |
| 4,726,094 | 2/1988 | Braeger | 17/54 |
| 4,738,004 | 4/1988 | Lapeyre | 17/52 |
| 4,748,724 | 6/1988 | Lapeyre et al. | 17/54 |
| 4,847,954 | 7/1989 | Lapeyre et al. | 17/54 |
| 4,868,951 | 9/1989 | Akesson et al. | 17/54 |
| 4,875,254 | 10/1989 | Rudy et al. | 17/61 |
| 4,962,568 | 10/1990 | Rudy et al. | 17/52 |
| 5,061,221 | 10/1991 | Holzhüter et al. | 452/184 |
| 5,133,687 | 7/1992 | Malloy | 452/157 |
| 5,194,036 | 3/1993 | Chevalier et al. | 452/157 |
| 5,249,491 | 10/1993 | Carter | 83/365 |

FOREIGN PATENT DOCUMENTS 889787 2/1962 United Kingdom .

Primary Examiner—Willis Little
Attorney, Agent, or Firm—Pravel, Hewitt, Kimball & Krieger

[57] ABSTRACT

An imaging system includes a method and apparatus for use in processing fish body sections that have been transversely cut. The system uses a frame with a pair of shrouds, each having an interior space that contains an illumination system for illuminating the fish section. A pair of video cameras housed respectively within the shrouds scan opposed flat sides of the fish section to produce images of the respective sides. Screens move behind the fish section in sequential fashion as each camera scans the fish section.

42 Claims, 15 Drawing Sheets

IMAGING SYSTEM FOR USE IN PROCESSING TRANSVERSELY CUT FISH BODY SECTIONS

BACKGROUND OF THE INVENTION

1. Field of the Invention

The present invention relates to fish processing and more particularly to an improved method and apparatus for processing a fish body that has been cut into a plurality of transverse fish body sections, and more particularly relates to an improved imaging apparatus that features imaging of both sides of a transverse fish slab section using automated illumination and background screening to produce an improved image of each of the opposed sides of a fish body section.

2. General Background

In the processing of fish such as tuna, it is common to freeze a catch of fish at sea, and to process the catch on shore. The processing normally involves thawing the fish followed by manual operations of slicing the fish belly and the removal of viscera. The visceral cavity is then washed with water, and the tuna inspected for spoilage. The tuna is then usually cooked whole in a batch type precooking operation.

Manual prior art methods of processing tuna are described in greater detail in U.S. Pat. No. 3,594,191 issued to J. M. Lapeyre. The '191 Lapeyre patent discloses the concept of cutting the tuna in lateral sections at spaced intervals and thereafter separating the edible loin portions to provide discrete cannable portions.

A later U.S. Pat. No. 3,593,370 entitled "Method of Butchering Tuna" issued to J. M. Lapeyre, describes a method for processing such transverse tuna sections while frozen. The method of butchering frozen tuna described in the '370 Lapeyre patent includes the subdivision of the whole fish into a plurality of transverse cross-sections and subsequently subdividing the cross-sections into frozen segments. The junctures between the segments are along lines generally parallel to the longitudinal axis of the fish and to the backbone thereof. Each lateral fish section is skinned and the skinned sections operated on to effect a separation of the scrap parts of the segments from the loin meat parts, while the latter were still in at least a partially frozen condition.

U.S. Pat. No. 3,800,363 issued to J. M. Lapeyre entitled "Tuna Butchering Method and System" describes an automated butchering method and system for separating the edible loin portions of transverse tuna slices provided by subdivision of a frozen whole tuna.

Three additional, more recently issued U.S. Patents include U.S. Pat. No. 4,748,724, entitled "Support Apparatus For Use In Video Imaging And Processing Of Transverse Fish Sections," U.S. Pat. No. Re. 33,917, entitled "Support Apparatus For Use In Video Imaging And Processing Of Transverse Fish Sections," and U.S. Pat. No. 5,181,879, entitled "Method And Apparatus For Processing Fish Into Transverse Sections."

U.S. Pat. Nos. 3,593,370; 3,594,191; 3,800,363; Re. 33,917; 4,748,724; and 5,189,879 are each incorporated herein by reference.

A problem encountered in the cutting of transverse sections (such as transversely cut fish) with a robotic knife that tracks according to a video image is precision. Precision is required to separate fish bones, blood meat, visceral and like non-edible portions from the edible portions if waste is to be minimized. Therefore, there is a need for an improved, precise video imaging system that can precisely process the section with minimum waste.

SUMMARY OF THE INVENTION

The present invention provides an improved imaging apparatus for processing transversely cut sections (such as transversely cut fish sections) which have generally flat opposing surfaces and a peripheral curved outer surface. The apparatus includes a support frame having a pair of spaced-apart shrouds mounted thereon, each of the shrouds having a hollow bore with a central longitudinal axis.

The central longitudinal axes of the bores can be aligned. A pair of video cameras are mounted respectively within the bores of the two shrouds. Each video camera defines a line of sight that generally tracks the central longitudinal portion of its shroud.

Half of this system can be used (i.e. a single video camera and a single shroud), and the section rotated about a known axis so that the camera takes a video image of each side. Another alternative embodiment can use the image from a prior adjacent transversely cut slab for one side of the present slab. This can be done where several transversely cut slabs are being processed in an assembly line. The slabs are cut from a fish body in sequence beginning at one end and progressing to the other end.

A gap between the shrouds defines a target area that is adapted to receive the fish body section to be processed. A holder supports a fish body section to be processed in a position that enables one of the cameras to view one of the flat opposing surfaces of the fish section and the other camera to view the other flat surface of the fish section.

In the preferred embodiment, a line of sight intersects the fish body section and also generally defines the central longitudinal axis of each of the shrouds. Means for maintaining the holder in the same position with respect to the line of sight ensures that the images of the fish body sections are referenced to a common frame of reference.

Inside each of the shrouds is an illumination system that comprises a plurality of light sources that illuminates all portions of the fish body section. At least some of the light sources are angularly oriented with respect to the line of sight so that the interface between one of the flat surfaces and the peripheral curved edge of the fish body section is enhanced by selectively casting shadows upon the curved edge.

Some of the light sources emit diffuse light, which is reflected by a reflector to illuminate a flat surface of the fish body section. A pair of screens rotate between engaged and disengaged positions. A screen is provided for each side of the fish body section so that when one camera is viewing a flat side of the fish body section, a screen is placed behind the fish body section to act as a black backdrop.

In the preferred embodiment, each screen is extended and retracted by an individual pressure-actuated cylinder and is mechanically isolated from the shrouds so that either of the two screens can be placed in position to act as a backdrop for one of the two video cameras without vibrating the imaging apparatus.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
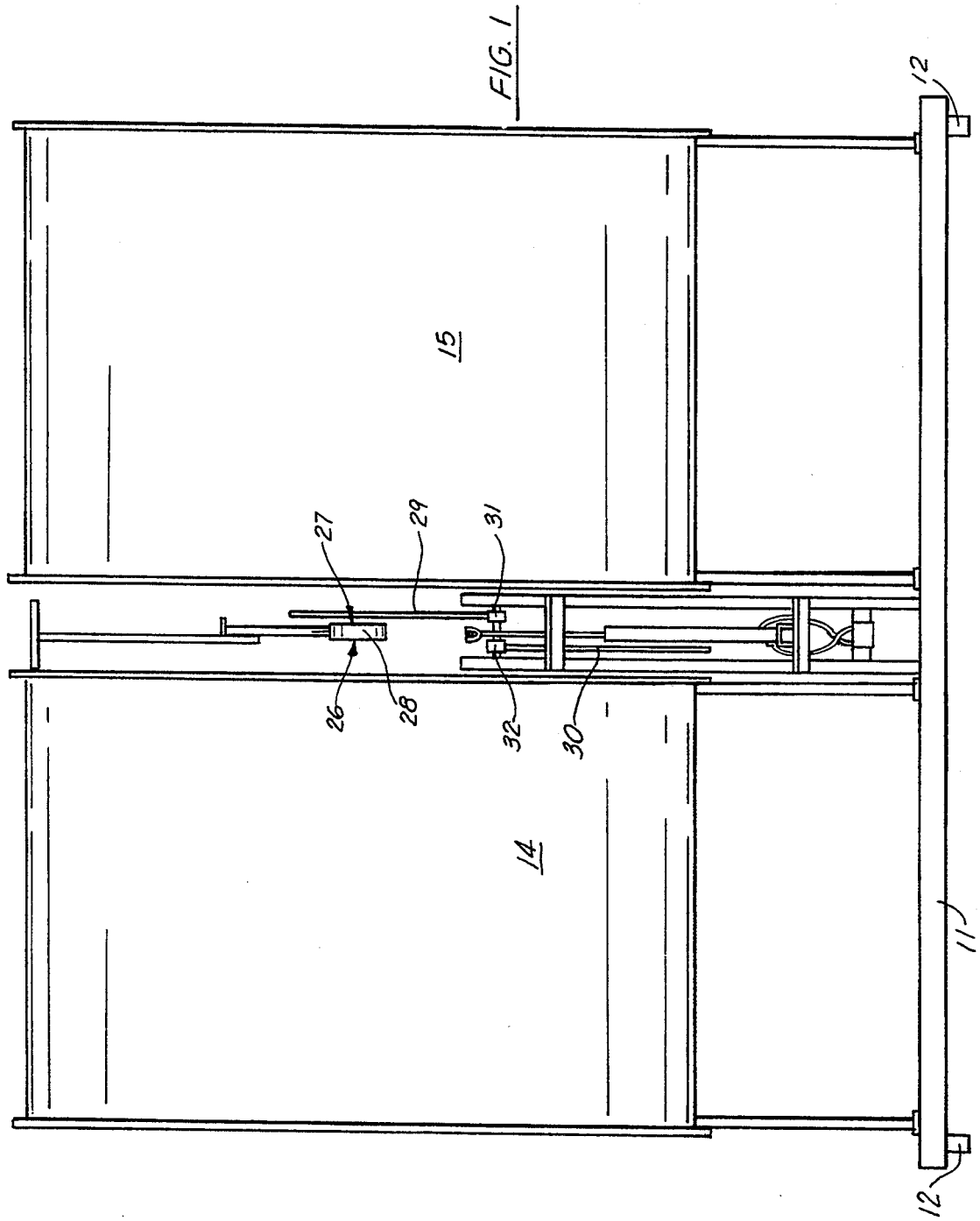
FIG. 1 is a side elevational view of a first embodiment of the apparatus of the present invention.

FIGS. 1–5 illustrate generally the preferred embodiment of the apparatus of the present invention designated generally by the numeral 10. Imaging apparatus 10 for use in processing transversely cut fish sections includes a frame 11 having feet 12 which can rest upon an underlying floor 13, such as for example, a shop floor or the like.

First and second cylindrical shrouds 14, 15 are supported upon frame 11. Each cylindrical shroud 14, 15 provides an outer wall and an internal cylindrical bore 16, 17 respectively. Shroud walls 18, 19 can be of sheet metal, for example. A gap 20 between the shrouds 14, 15 allows background sheets 29, 30 to be placed behind a transverse section 25 during imaging.

Holder 21 includes a vertical strut 22 with indexing pins 23 thereon. The indexing pins 23 are vertically spaced apart during use. Pins 23 affix holder 21 in a known position. Holder support 24 is secured to wall 18. Holder 21 supports a fish section 25 in a generally vertical orientation so that the opposed surfaces 26, 27 of the transverse fish slab section 25 are generally vertically oriented and at right angles to the camera line of sight. The opposed surfaces 26, 27 communicate with a peripheral curved surface 28 (e.g., the skin of the fish if not yet removed).

During imaging, background screen sheets 29, 30 are sequentially positioned behind the transverse fish section 25 while an image is being taken of the fish section surface 26 or 27, as selected. Sheets 29, 30 are preferably black in color. One of the background sheets 29, 30 is in position behind the fish section opposite the position of the camera that is imaging the opposed surface 26 or 27. Each background sheet 29, 30 can be mounted to a rotating bushing 31, 32, each of which is attached to rotary shaft 33, rotating therewith. The shaft 33 is rotated using link 34 that is powered with pushrod 35 extending from extensible fluid cylinder 36. Cylinder 36 can be hydraulically, pneumatically, or electrically operated. Extensible cylinder 36 is attached at cylinder end support 37 to frame 11.

Figure 2:
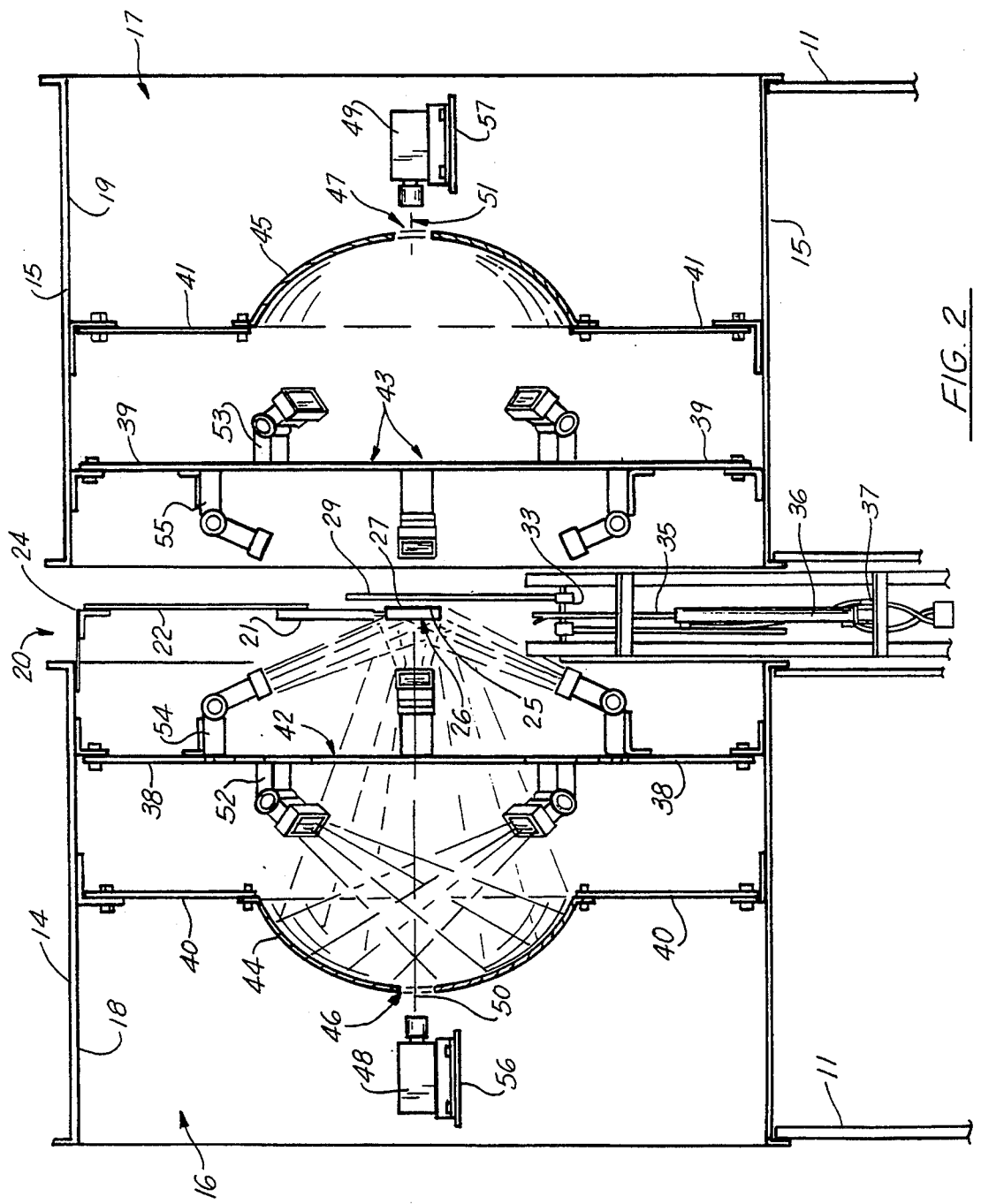
FIG. 2 is a side sectional elevational view of the first embodiment of the apparatus of the present invention.
Figure 3:
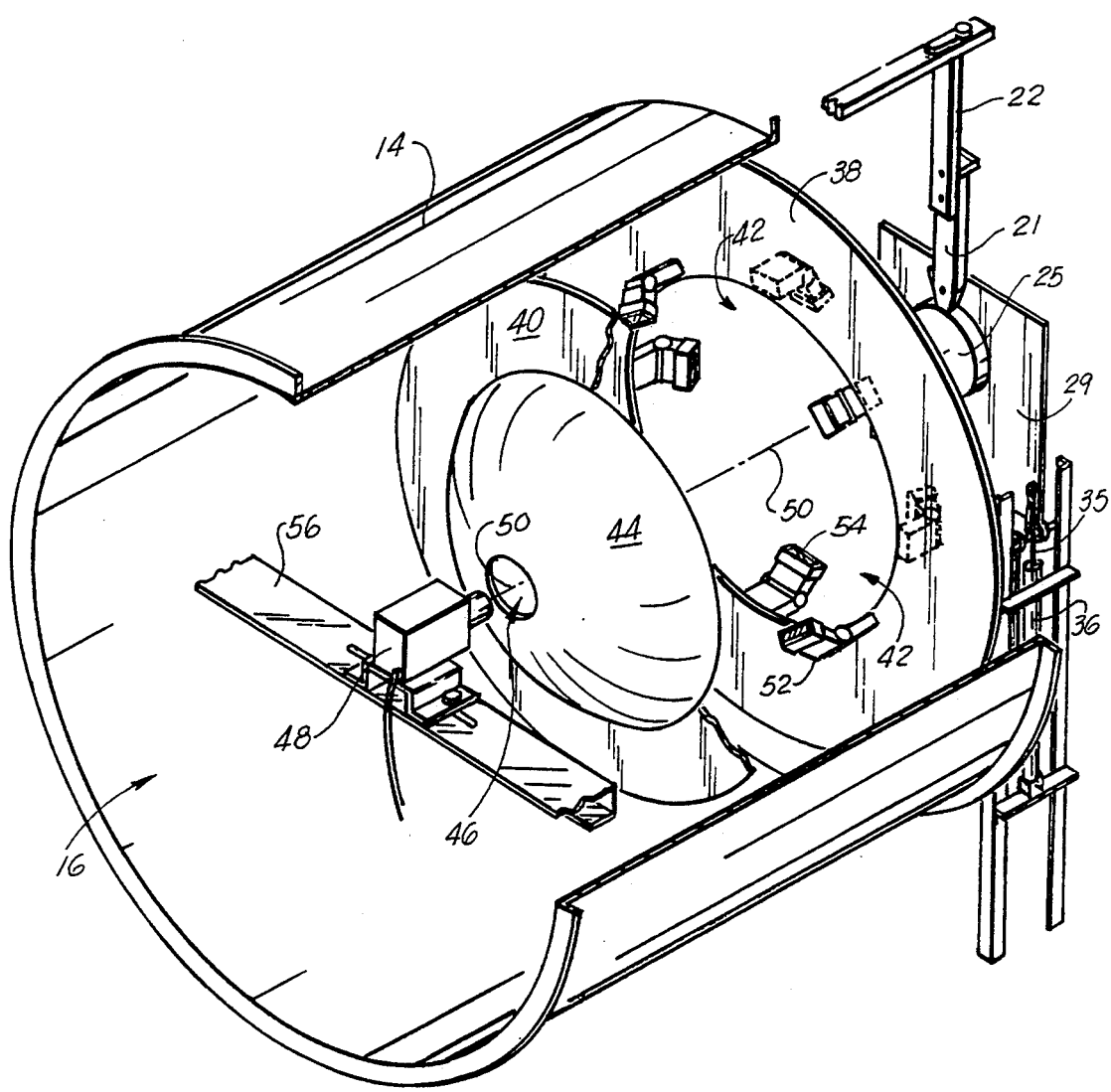
FIG. 3 is a fragmentary perspective partially cutaway view of the first embodiment of the apparatus of the present invention.

Each shroud 14, 15 provides a forward baffle plate 38, 39 and a rear baffle plate 40, 41. Openings 42, 43 allow lighting and the video image to pass through the rear baffle plates as shown. Concave/convex members 44, 45 are mounted upon the baffle plates 40, 41 respectively, as shown in FIG. 2. Openings 46, 47 respectively are provided in concave/convex members 44, 45 so that the line of sight 50, 51 is provided between the fish section 25 and each video camera 48, 49. Lighting sources (in the form of strobes, for example) 52, 53, 54, 55 are provided for illuminating the opposed surfaces 26, 27 of the transverse fish slab section 25.

A plurality of rear light sources 52, 53 is provided, as well as a plurality of forward light sources 54, 55 respectively in the two shrouds 14, 15. Each camera 48, 49 is supported upon a camera support 56, 57 respectively.

A scanned image of the first opposing surface 26 is taken with the surface illuminated uniformly by diffuse lighting emitted by rear light sources 52 and reflected off the concave surface of concave/convex member 44. Forward light sources 54 direct light obliquely at edge portions of the first opposing surface 26 to illuminate the surface portion brightly, while casting a shadow at the edge and beyond. In this way accurate images of the edges (i.e., the skin) are obtained. If skinning is not required, edge images need not be taken. Diffuse lighting can be provided by fluorescent sources and a single image of the first opposing surface 26 taken without the need for sequential strobing.

Figure 5:
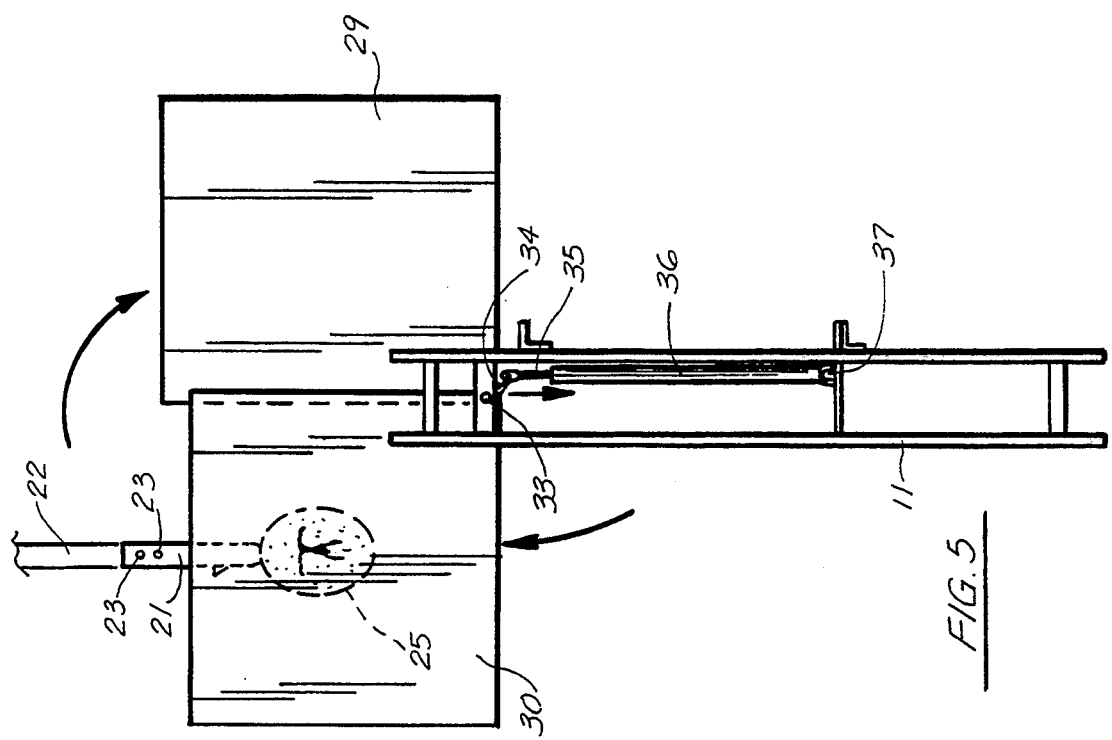
FIG. 5 is another fragmentary elevational view of the first embodiment of the apparatus of the present invention.
Figure 4:
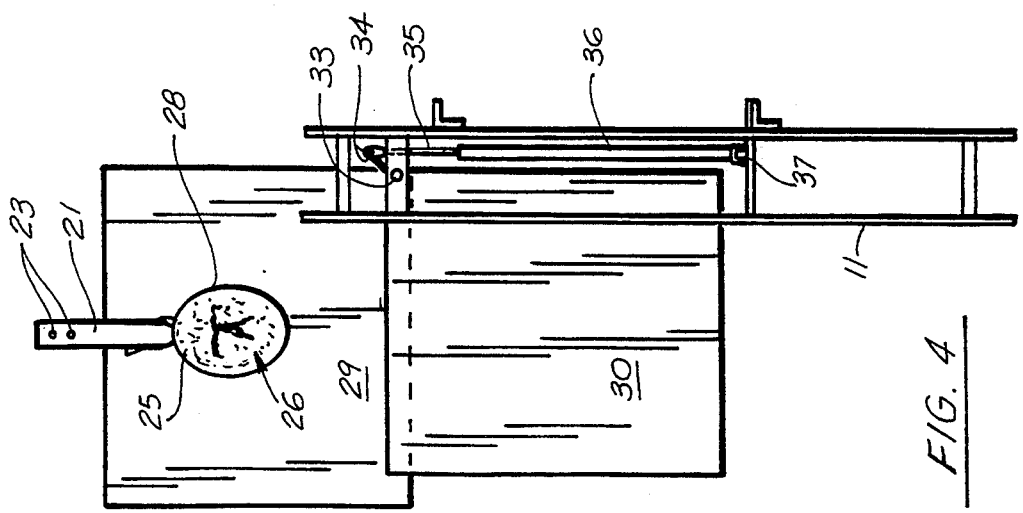
FIG. 4 is a partial elevational view of the first embodiment of the apparatus of the present invention.

During operation, the video camera 48 first scans the first opposing surface 26 with background sheet 29 in position behind the fish slab section 25 to produce an image of the first surface 126. In FIG. 4, the fish slab 25 is shown held by the holder 31 and with the background sheet member 29 in position. FIG. 4 shows the view that is seen by camera 48. In FIG. 5, the background sheet 29 has been rotated away from the fish slab section 25 and the background sheet 30 has been moved into position so that the camera 49 is now viewing opposed surface 27 of fish slab section 25 along line of sight 51.

Figure 6:
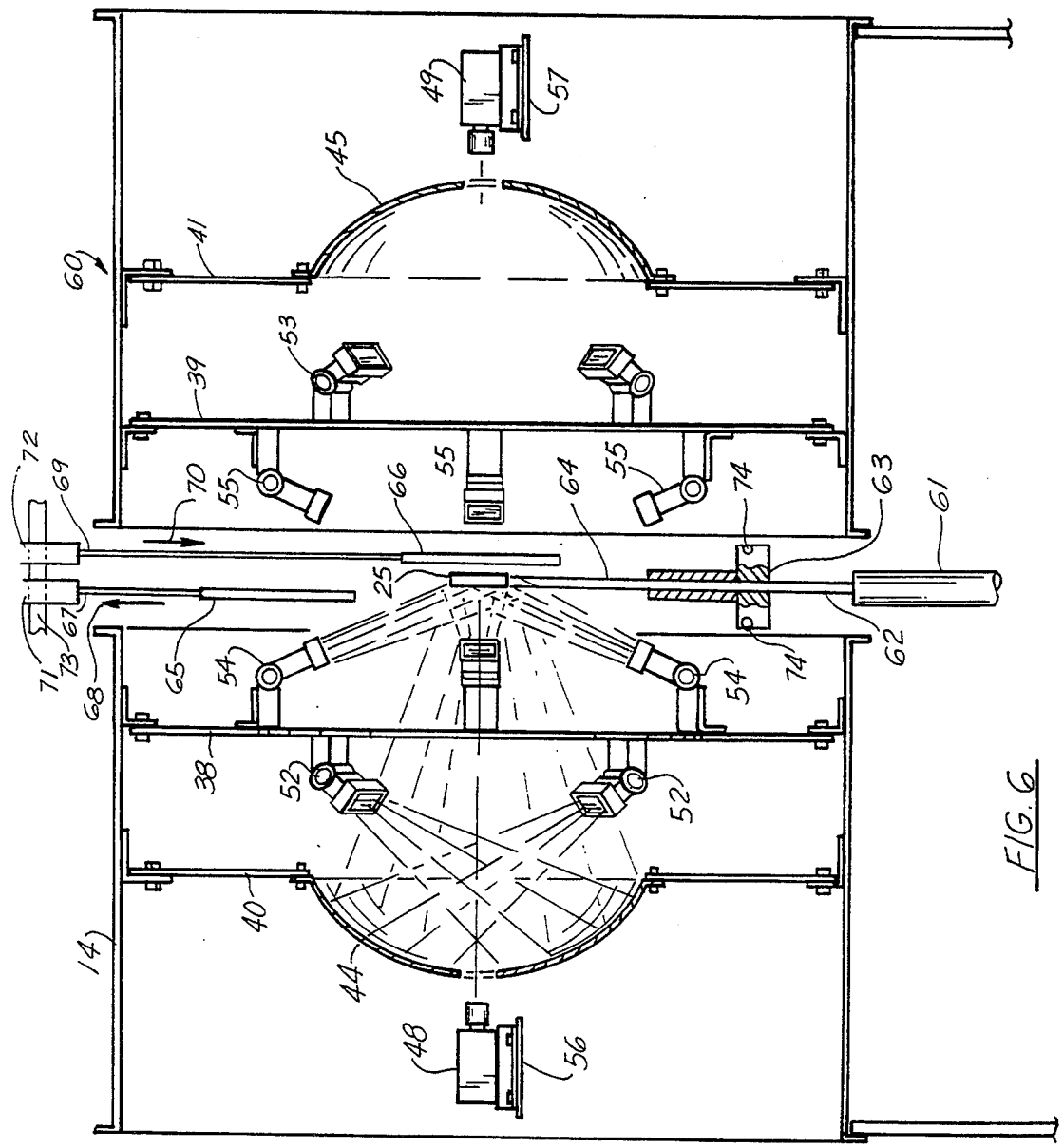
FIG. 6 is a side view of an alternate embodiment of the apparatus of the present invention.
Figure 7:
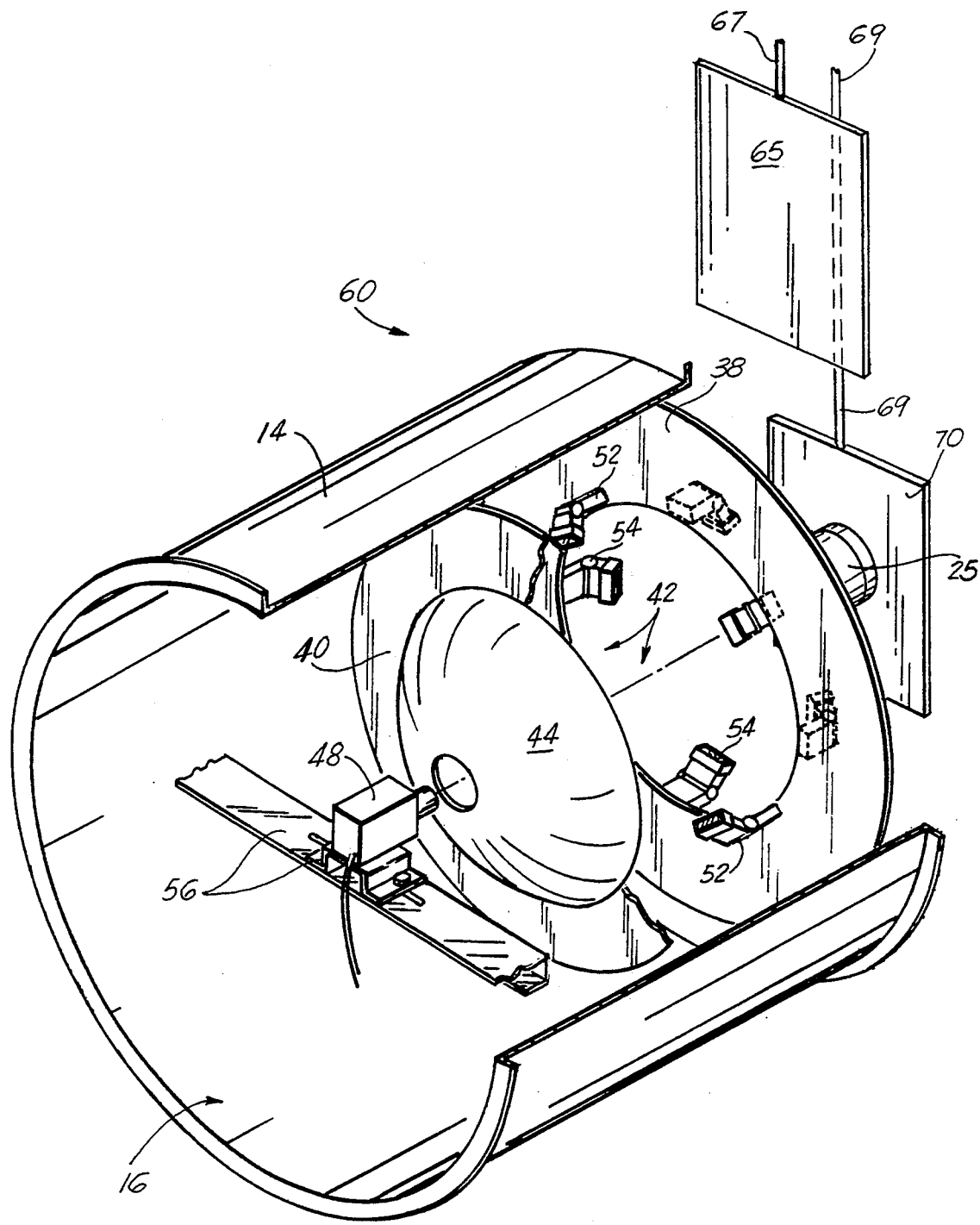
FIG. 7 is a perspective view of a second alternate embodiment of the apparatus of the present invention.

In FIGS. 6–7, a second embodiment of the apparatus of the present invention is designated generally by the numeral 60. A slab 25 is supported upon holder 64, vertically referenced by a positioner 61 in the form of a cylinder having an extensible pushrod 62 extending through carrier 63 to support holder 64. Carrier 63, on conveyor rails 74, carries a transverse slab 25 impaled on holder 64 into position above positioner 61. The pushrod 62 pushes the holder 64 up through the carrier 63 until the slab 25 is positioned to be viewed by a video camera 48 or 49. A pair of screens 65, 66 are respectively mounted upon pushrods 67, 69. The pushrods are movable between engaged and disengaged positions as shown by the movement of arrows 68 and 69 in FIG. 6. The arrow 70 shows an extended, operative position wherein the screen 66 is shown behind the fish slab 25. Arrow 68 illustrates a retracted position of screen 65. In FIG. 6, the camera 68 is imaging a side of the slab 25 with the help of illumination provided by strobes 52, 54. In order to provide imaging with video camera 59, the screen 66 would be withdrawn and the screen 68 moved into a position behind the slab 25 to form a backdrop for the video imaging of the slab 25. When imaging with camera 49, the strobes 53, 55 provide illumination and the screen 65 forms a backdrop. The pushrods 67, .59 are operated with a pair of pressure-actuated cylinders 71, 72 which can be pneumatic or hydraulic. Cylinders 71, 72 are anchored to a suitable support 73, preferably mechanically isolated from the rest of the imaging system 60.

Figure 8:
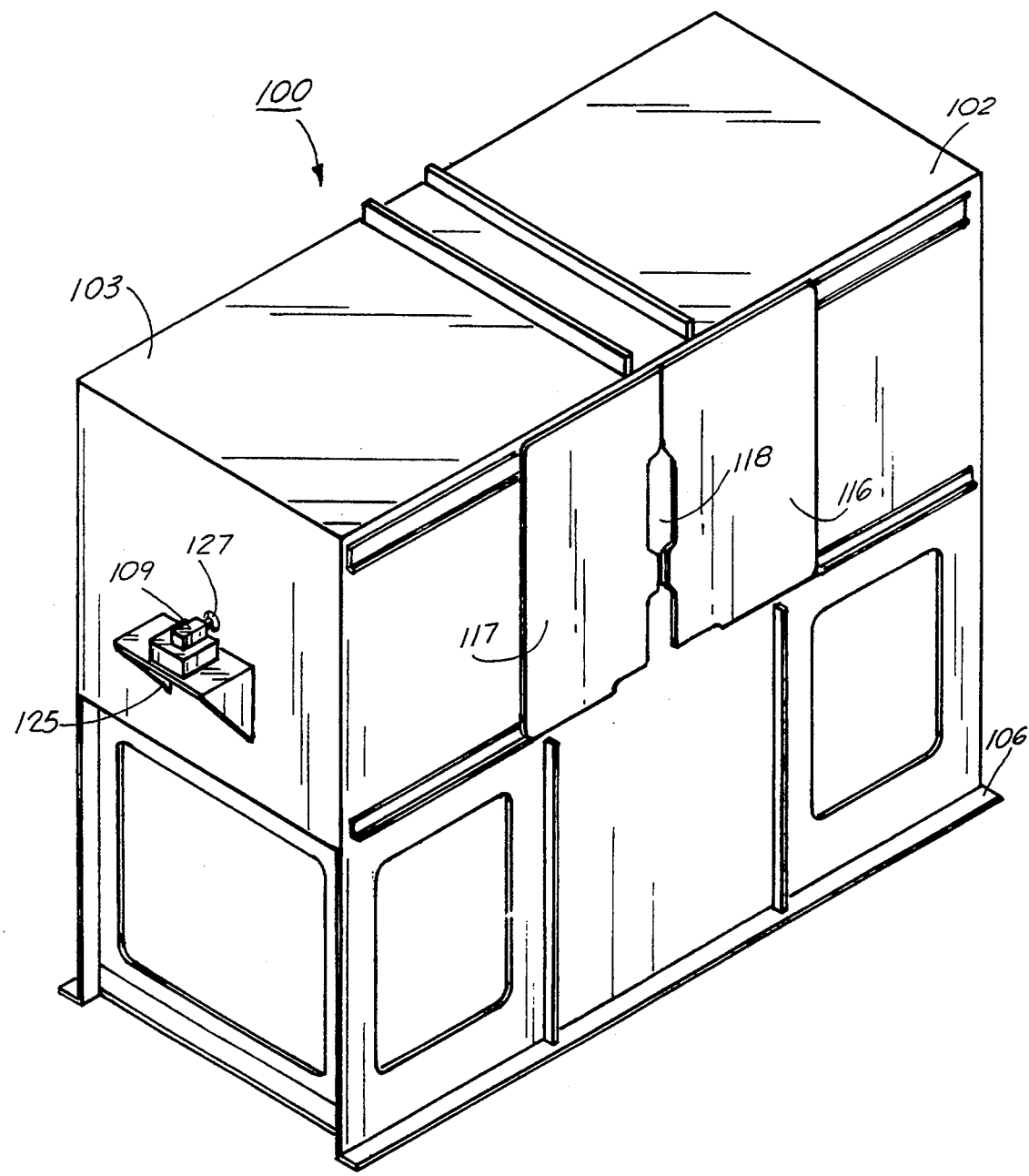
FIG. 8 is a perspective view of another embodiment of the imaging system of the present invention.
Figure 9:
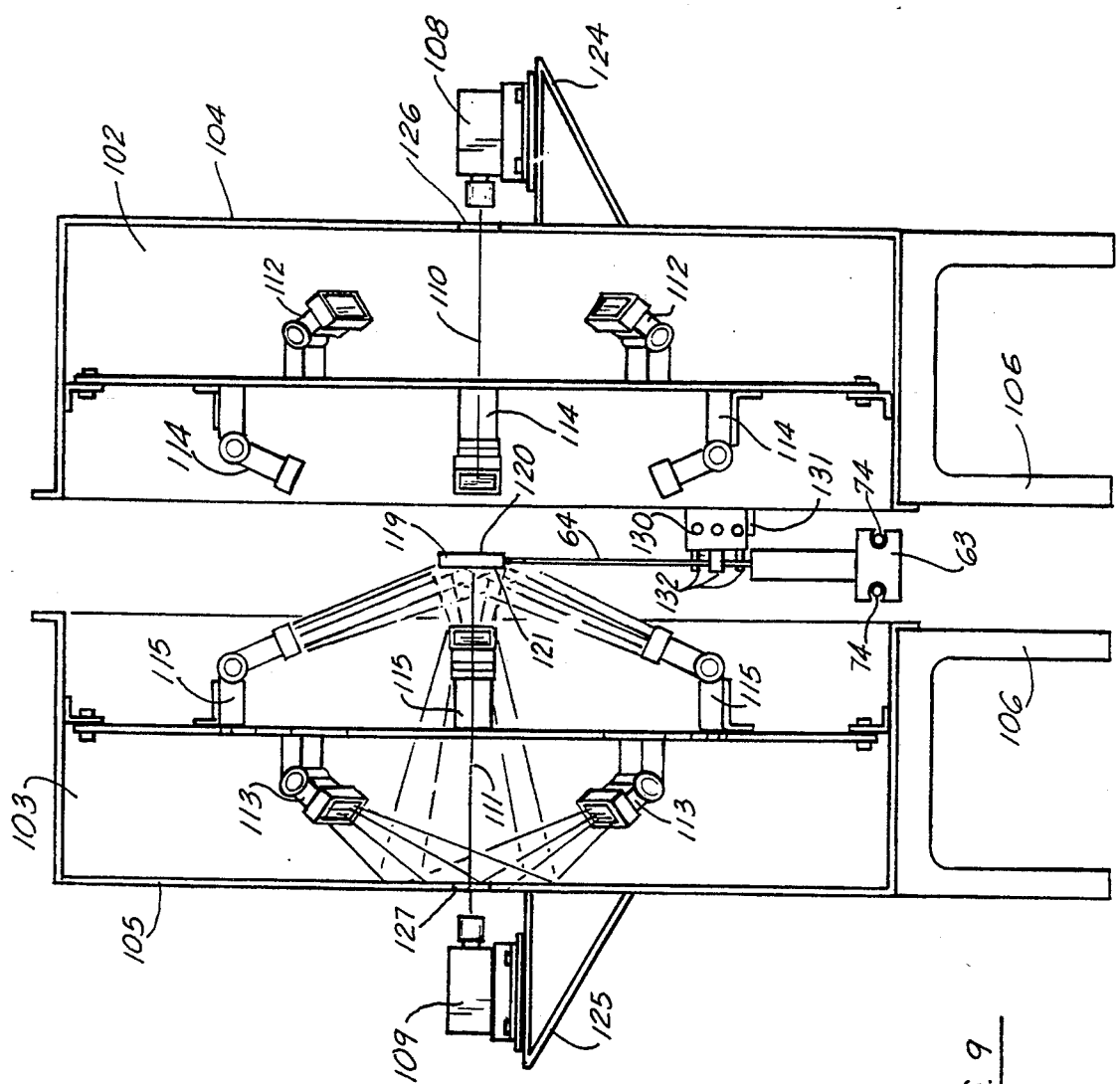
FIG. 9 is a side sectional view of the embodiment of FIG. 8.

Another embodiment of the imaging apparatus of the invention is shown in FIGS. 8–9. This embodiment of the apparatus 100 differs from those shown in FIGS. 1–7 in that shrouds 102, 103 are principally parallelepipeds rather than cylinders. Furthermore, reflectors 104, 105 are flat plates (e.g., the backs of the shrouds 102, 103) rather than concave/convex members. The shrouds 102, 103 are mounted on a support frame 106. Cameras 108, 109 are mounted on stands 124, 125 at the ends of the shrouds 102, 103 and view the target area along longitudinal lines of sight 110, 111 through a central hole 126, 127 in each reflector 104, 105. Rearward-facing light sources 112, 113 provide diffuse light reflected off the reflectors 104, 105 for uniformly illuminating the flat surfaces 120, 121 of the fish section 119. Forward-facing light sources 114, 115 obliquely illuminate individual portions of the flat surfaces 120, 121 to provide a sharp image of the edges, i.e., the skin. Slidable side doors 116, 117 on each side of the apparatus 100 permit access for servicing. When closed, the doors 116, 117 define a port 118 through which the fish section 119 can be conveyed along rails 74. A backdrop (not shown in FIG. 9) is provided by screens 65, 66 as in FIG. 6.

A device for gripping the holder 64 to maintain the fish body section 119 in known registered position with respect to the lines of sight 110, 111 of the cameras 108, 109 during the imaging process is supported on a support 131 attached to one of the shrouds 102. Fingers 132 protruding from the gripping device 130 retain the holder 64 by means of pneumatic pressure, for instance. After imaging, the fingers 132 are retracted, thereby releasing the holder 64 so that the fish body section 119 can be conveyed out of the imaging station by the carrier 63 along rails 74.

Figure 10:
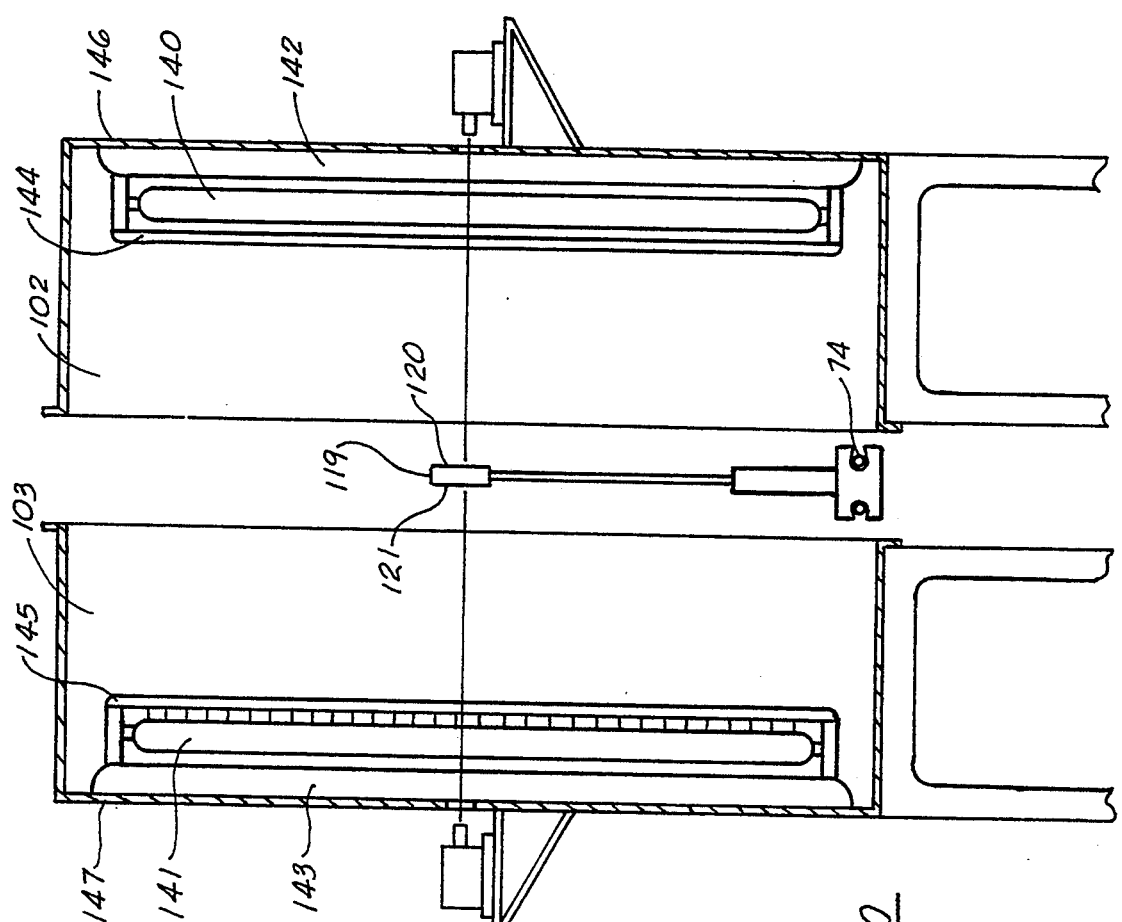
FIG. 10 is a side sectional view of another embodiment of the system using fluorescent lighting.

Yet another embodiment of the parallelepiped imaging station is shown in FIG. 10, in which the strobe lights are replaced by vertically oriented fluorescent tubes 140, 141. The tubes 140, 141 are mounted in fixtures 142, 143 attached to the back walls 146, 147 of the shrouds 102, 103. Diffusers 144, 145 over the tubes 140, 141 diffuse the emitted light to uniformly illuminate the surfaces 120, 121 of the fish body section 119. This imaging station is simpler than that of FIG. 9 and can be used when imaging of the edges (i.e., the skin) of the fish body section 119 is not required, such as for a skinned fish.

It is also possible to offset the two identical halves of the imaging systems of FIGS. 1–10 along a conveying path so that opposite surfaces of a fish slab can be scanned at separate locations, thereby allowing two slabs to be scanned simultaneously for faster throughput. Another possibility is to rotate the slabs about a known axis between scans of each opposing surface by a single camera. If consecutively conveyed slabs are contiguous portions of a fish, surfaces on consecutive slabs separated along a common cut line should be substantially mirror images of each other. Consequently, the image data of one should contain the image data of the other. Elimination of some redundant scans is possible.

To improve the quality of the image produced by the imaging system, the faces 120, 121 of the fish body section 119 can be rapidly steam heated to improve contrast between the blood meat and the loin meat portions. The vision cooker 150 in FIGS. 11–13 comprises two shrouds 151, 152 enclosing steam manifolds 153, 154 connected to a controllable source of steam (not shown) via steam lines 155, 156. The shrouds 151, 152 are pivotally pinned at their bottom corners to blocks 157 by pivot pins 158. Flanges 159–162 attached to the upper corners of the shrouds 151, 152 extend outward and upward of the shrouds 151, 152. Pushrods 167, 168 extending from pneumatic cylinders 163, 164 are pivotally attached at opposing pairs of flanges 159, 160 and 161, 162 by pivot joints 165. A source of pneumatic pressure (not shown) operates the cylinders 163, 164 through air lines 166. As the cylinders 163, 164 are pressurized together, the pushrods 167, 168 are pushed out of the cylinders, thereby exerting a force against the flanges 159–162, which causes the shrouds 151, 152 to pivot open about the pivot pins 158 as indicated by arrows 169. With the shrouds 151, 152 open, the fish body section 119 can be conveyed into or out of the steam chamber 170 by carrier 63 along rails 74. With the fish body section 119 in position in the steam chamber 170, the pneumatic pressure is reduced to close the shrouds 151, 152, thereby enclosing the fish body section 119 with its surfaces 120, 121 close to the steam exit holes 172 of the manifolds 153, 154. Steam 171 impinging on the surfaces 120, 121 thaws the sheared meat fibers and allows them to rehydrate, which increases the contrast between the light loin portions and the dark blood meat portions. Only a few seconds of steaming is required to adequately produce the desired contrast. Exhaust steam exits through the opening 173 in the top of the vision cooker 150.

Figure 11:
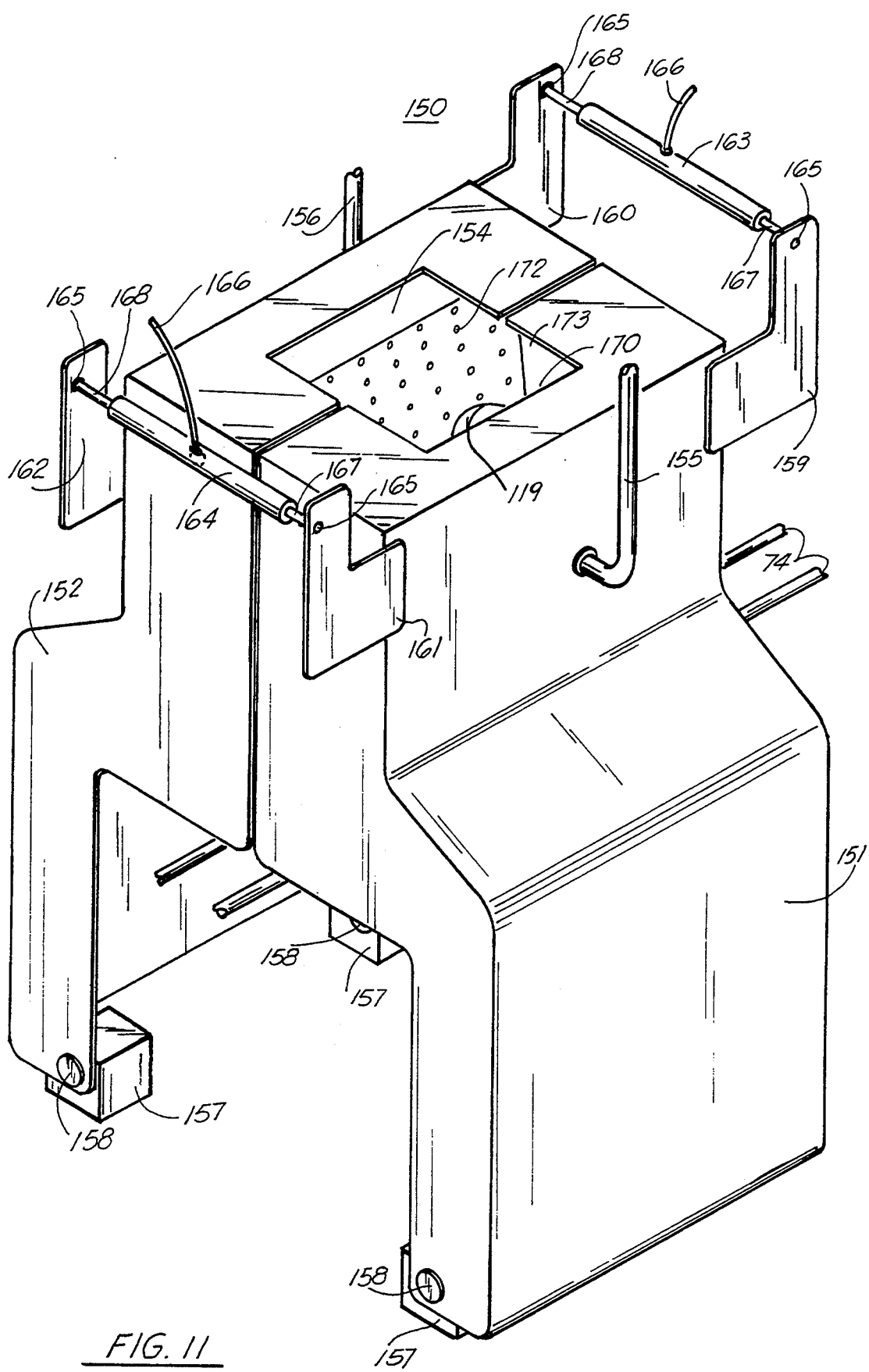
FIG. 11 is a perspective view of the vision cooker of the invention.
Figure 12:
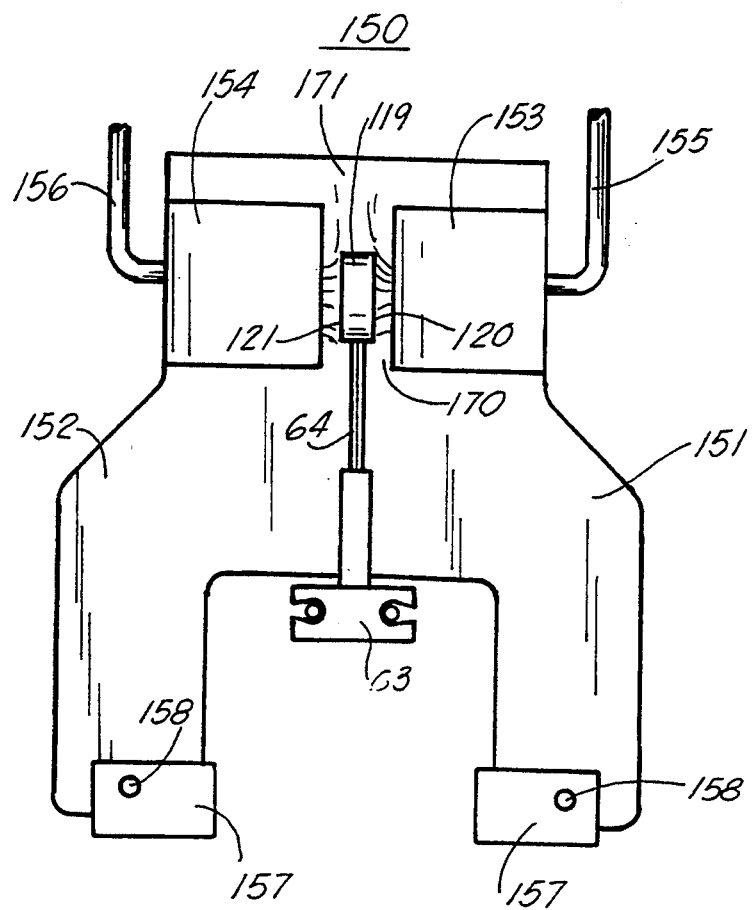
FIG. 12 is a side sectional view of the vision cooker of the invention.
Figure 13A:
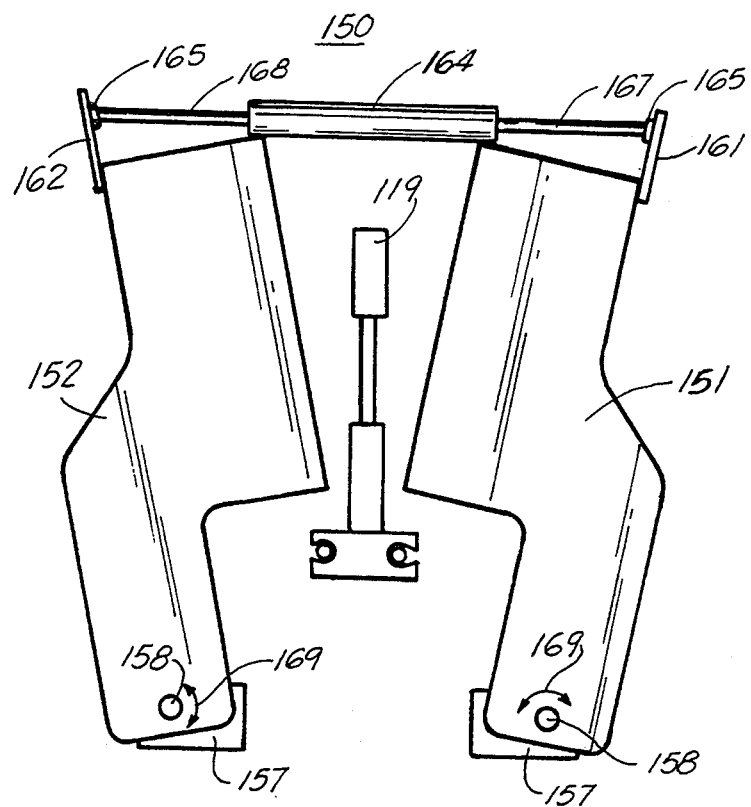
FIG. 13A is a side view of the vision cooker with the shrouds in an open position.
Figure 13B:
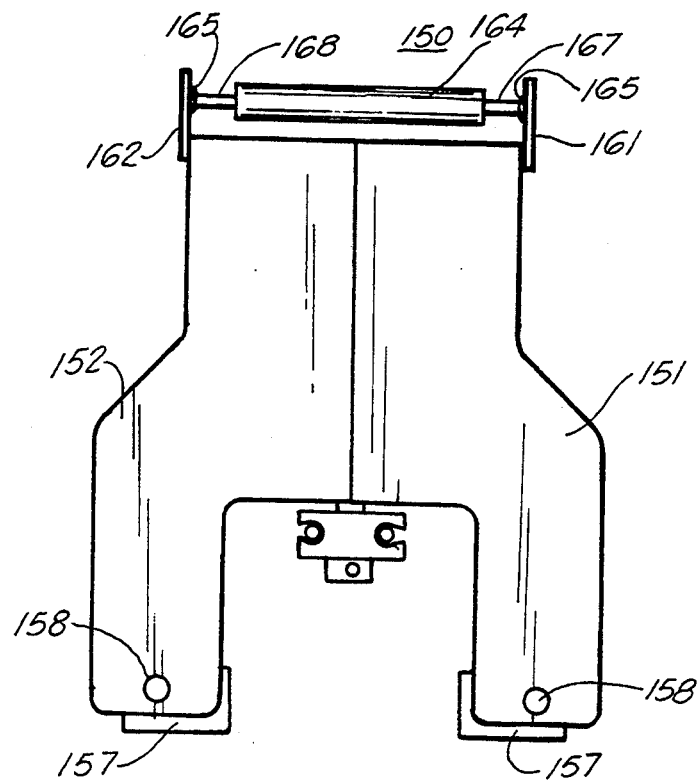
FIG. 13B is a side view of the vision cooker with the shrouds in a closed position.
Figure 14:
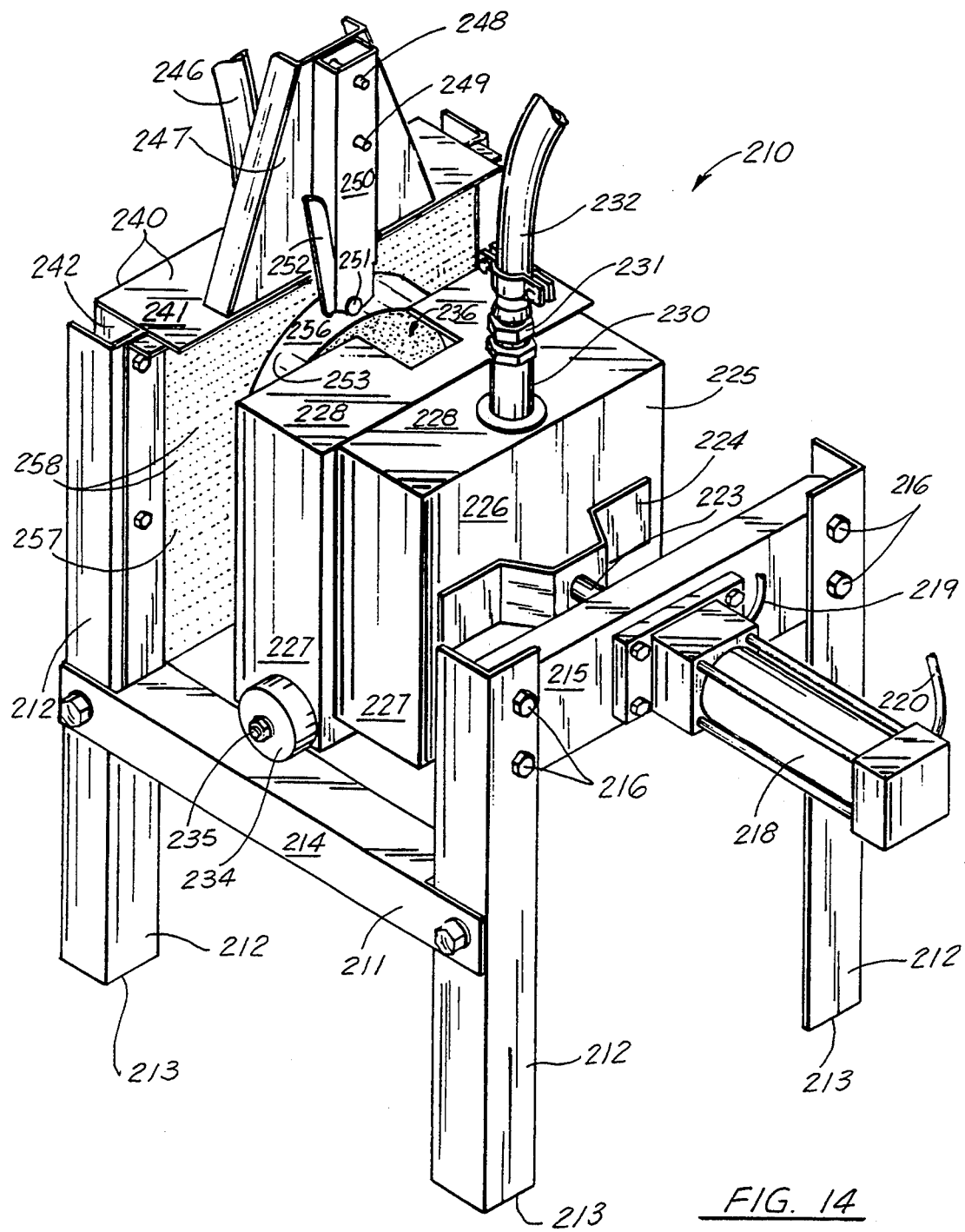
FIG. 14 is a perspective view of another embodiment of the vision cooker of the invention.
Figure 15:
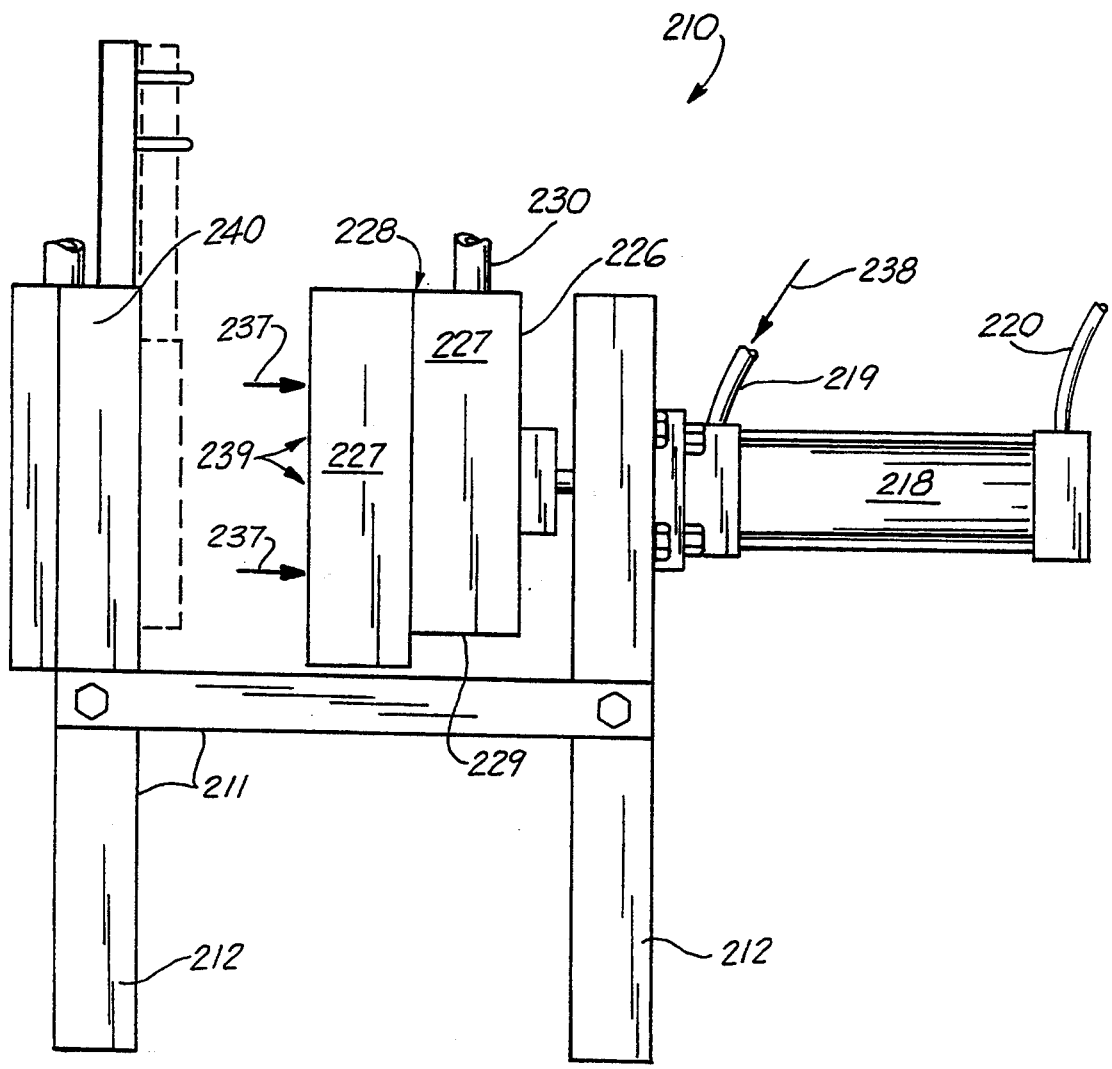
FIG. 15 is a side view of the embodiment of FIG. 14 with the shrouds in an open position.
Figure 16:
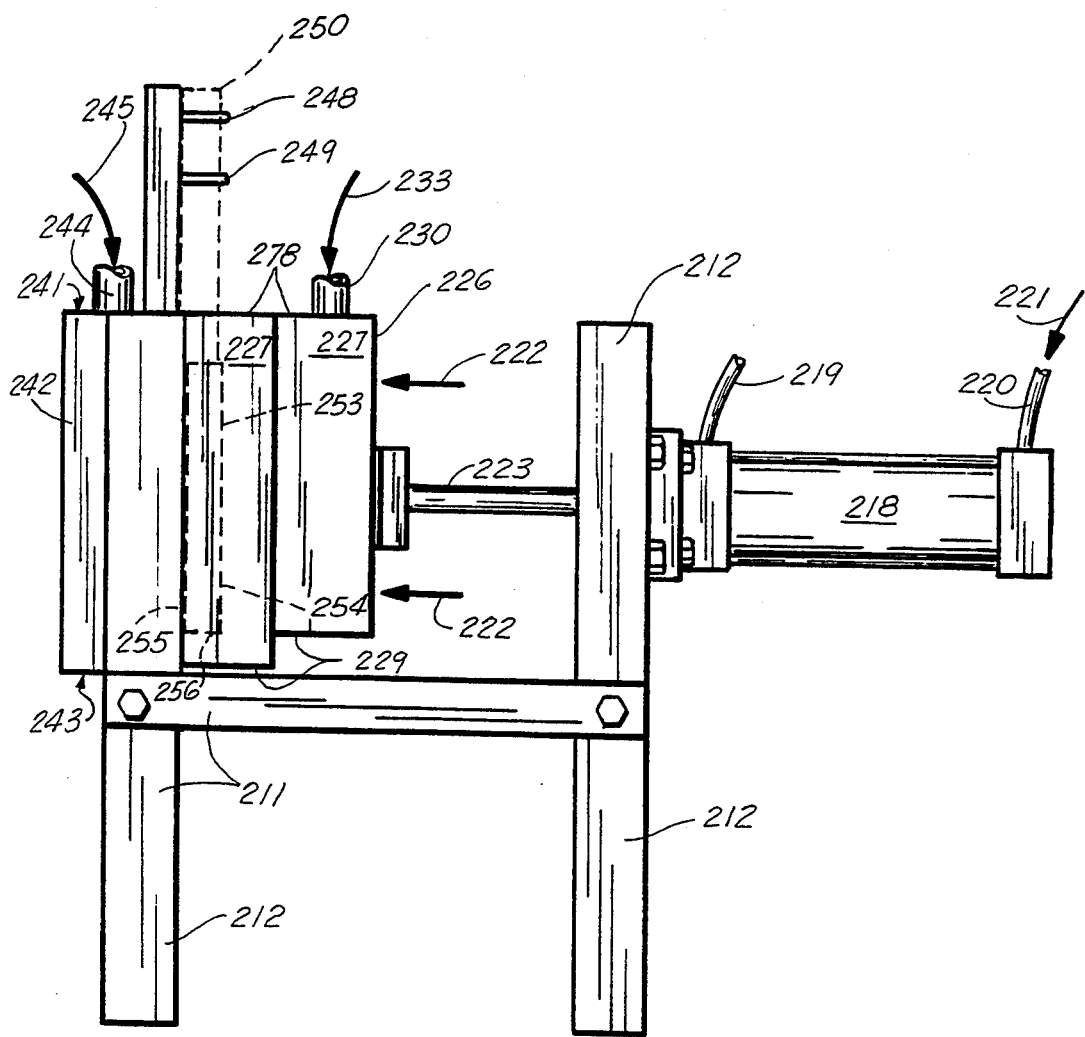
FIG. 16 is a side view of the embodiment of FIG. 14 with the shrouds in a closed position.

FIGS. 11–13 illustrate another embodiment of the vision cooking apparatus of the present invention designated generally by the numeral 210. Flash cooker apparatus 210 includes a frame 211 having a plurality of legs 212 with a plurality of feet 213 respectively.

The frame includes transversely extending beams 214 and 215. Bolted connections 216, 217 secure the beams 214 and 215 to the legs 212 as shown in FIG. 11. A fluid cylinder 218 such as a pneumatic cylinder is provided for moving a first moving shroud 225 with respect to a fixed shroud 240. Flow lines 219, 220 transmit fluid to and from fluid cylinder 218 for powering the extensible pushrod 223 portion thereof as shown by the arrows 221 and 222 in FIG. 13. The arrow 221 indicates the flow of fluid to cylinder 218 via a flowline 220.

The arrows 222 indicate the movement of extensible pushrod 223 and its attached moving shroud 225 toward a closed position. The closed position is shown in FIG. 13. In FIG. 12, the open position is shown with arrows 237 indicating an opening movement of shroud 225 with respect to the fixed shroud 240.

The moving shroud 225 includes rear wall 226, side walls 227, top wall 228, and bottom wall 229. The shroud 225 is thus generally rectangular, in the form of a rectangular box with the front, rear, side, and bottom walls being orthogonally connected. Upon closure the shrouds form a box-like enclosure about the fish section to be processed. A steam inlet opening 230 communicates with detachable connection 231 to steam inlet line 232. Arrow 233 designates the flow of steam into the shrouds 225,240 when in the closed position of FIG. 13. The moving shroud 225 can have a pair of spaced apart wheels 234 mounted upon axle 235.

Recess 236 in top wall accommodates holder 250 when the moving shroud 225 assumes the closed position of FIG. 13. Arrow 238 in FIG. 12 indicates the flow of fluid via flowline 219 into cylinder 218 for moving the extensible pushrod 223 to an inward most retracted position as shown in FIG. 12. In this position, the arrows 237 designate movement of shroud 225 away from fixed shroud 240. The fixed shroud 240 includes top wall 241, side walls 242, and bottom walls 243. Shroud 240 is preferably similarly shaped and sized to the moving shroud 225 so that the two shrouds form a rectangular box like enclosure about the fish section to be processed when in the closed position of FIG. 13.

Arrow 245 in FIG. 13 illustrates the flow of steam into fixed shroud 240 via steam inlet opening 244. Steam flowline 246 can be removably attached to inlet 244 using a removable connection for example. Holder support bracket 247 includes a pair of spaced apart, generally horizontally extending indexing pins 248, 249 which accommodate holder 250. Holder 250 includes a pivoting portion 251 and a blade handle 252. Alternatively, a holder such as holder 64 and carriage 63 as in FIG. 6 could be used to transport the fish section 253 into and out of the cooker 210 and to support it in place during cooking.

The holder 250 can grip a transversely cut fish section 253 so that the front flat surface of fish section 255 and the rear flat surface of fish section 253 respectively face the shrouds 225, 240. In this position, the peripheral surface 256 of the fish section 253 faces side walls 227 and 242.

Each shroud 225, 240 carries a perforated steam panel 257 with a plurality of openings 258 extending over the surface of plate 257 in array form as shown in FIG. 11. The steam panels 257 are designed to fit closely against the surfaces 254, 255 of the fish section 253 when the shrouds 225, 240 are in a closed position. In this fashion, steam exits each of the plurality of openings 258 producing a uniform precook to at least the outer surface of each flat surface 254, 255 of the fish section 253 which is preferably frozen. It has been found that frozen fish sections 253 are preliminarily cooked in a flash or quick cook fashion so that only the very outermost surfaces 254, 255 are thawed and cooked, producing greater contrast between the lighter edible meat portion as compared with the darker blood meat, bone, and visceral portions of the fish section 253. The fish section 253 still remains frozen and stiff, because only a very thin outer layer at each surface 254, 255 is thawed and cooked. This contrast helps in the imaging of each fish section so that a computer can translate the video information into cutting information for an automated cutting knife.

The aforedescribed improved imaging system provides improved image quality which enhances the accuracy and precision with which a water jet knife can cut the transverse fish slab section 25 as described, for example, in prior U.S. Pat. Nos. 4,748,724 and 4,847,954.

In addition, the support technique provides faster and less involved throughput of transverse fish sections through the visioning/imaging apparatus.

The following Table I lists the parts as used in the specification and in the accompanying drawings including the part number and its description.

TABLE I

PARTS LIST

| Part Number | Part Description |
| --- | --- |
| 10 | imaging apparatus |
| 11 | frame |
| 12 | feet |
| 13 | floor |
| 14 | shroud, cylindrical |
| 15 | shroud, cylindrical |
| 16 | cylindrical bore |
| 17 | cylindrical bore |
| 18 | shroud wall |
| 19 | shroud wall |
| 20 | gap |
| 21 | holder |
| 22 | vertical strut |
| 23 | indexing pins |
| 24 | holder support |
| 25 | transverse fish section |
| 26 | opposed surface of fish section |
| 27 | opposed surface of fish section |
| 28 | peripheral surface |
| 29 | background sheet |
| 30 | background sheet |
| 31 | bushing |
| 32 | bushing |
| 33 | rotary shaft |
| 34 | link |
| 35 | pushrod |
| 36 | extensible cylinder |
| 37 | cylinder end support |
| 38 | forward baffle plate |
| 39 | forward baffle plate |
| 40 | rear baffle plate |
| 41 | rear baffle plate |
| 42 | opening |
| 43 | opening |
| 44 | concave/convex member |
| 45 | concave/convex member |
| 46 | opening |
| 47 | opening |
| 48 | camera |
| 49 | camera |
| 50 | line of sight |
| 51 | line of sight |
| 52 | strobes, rear |
| 53 | strobes, rear |
| 54 | strobes, front |
| 55 | strobes, front |
| 56 | camera support |
| 57 | camera support |
| 60 | imaging apparatus |
| 61 | holder |
| 62 | pushrod |
| 63 | carrier |
| 64 | arm |
| 65 | screen |
| 66 | screen |
| 67 | pushrod |
| 68 | arrow |
| 69 | pushrod |
| 70 | arrow |
| 71 | cylinder |
| 72 | cylinder |
| 73 | support |
| 74 | conveyor rails |
| 100 | vision cooker |
| 102 | shroud, parallelepiped |
| 103 | shroud, parallelepiped |
| 104 | reflector plate |

TABLE I-continued

PARTS LIST

| Part Number | Part Description |
|---|---|
| 105 | reflector plate |
| 106 | frame, vision cooker |
| 108 | camera |
| 109 | camera |
| 110 | line of sight |
| 111 | line of sight |
| 112 | light source, rearward |
| 113 | light source, rearward |
| 114 | light source, forward |
| 115 | light source, forward |
| 116 | side door, right |
| 117 | side door, left |
| 118 | port |
| 119 | fish slab |
| 120 | fish slab surface |
| 121 | fish slab surface |
| 124 | camera stand |
| 125 | camera stand |
| 126 | reflector hole |
| 127 | reflector hole |
| 130 | gripping device |
| 131 | gripper support |
| 132 | fingers |
| 140 | fluorescent tube |
| 141 | fluorescent tube |
| 142 | fluorescent fixture |
| 143 | fluorescent fixture |
| 144 | diffuser |
| 145 | diffuser |
| 146 | back wall |
| 147 | back wall |
| 150 | vision cooker |
| 151 | shroud |
| 152 | shroud |
| 153 | steam manifold |
| 154 | steam manifold |
| 155 | steam line |
| 156 | steam line |
| 157 | support block |
| 158 | pivot pin |
| 159 | flange |
| 160 | flange |
| 161 | flange |
| 162 | flange |
| 163 | pneumatic cylinder |
| 164 | pneumatic cylinder |
| 165 | pivot joint |
| 166 | air line |
| 167 | pushrod |
| 168 | pushrod |
| 169 | arrow |
| 170 | steam chamber |
| 171 | steam |
| 172 | manifold holes |
| 173 | exhaust opening |
| 210 | flash cooker apparatus |
| 211 | frame |
| 212 | legs |
| 213 | feet |
| 214 | transverse beam |
| 215 | transverse beam |
| 216 | bolted connection |
| 217 | bolted connection |
| 218 | fluid cylinder |
| 219 | flow line |
| 220 | flow line |
| 221 | arrow |
| 222 | arrow |
| 223 | pushrod |
| 224 | support bracket |
| 225 | moving shroud |
| 226 | rear wall |
| 227 | side wall |
| 228 | top wall |
| 229 | bottom wall |
| 230 | steam inlet opening |
| 231 | detachable connection |
| 232 | steam inlet line |
| 233 | arrow |
| 234 | wheels |
| 235 | axle |
| 236 | recess |
| 237 | arrow |
| 238 | arrow |
| 239 | hollow interior |
| 240 | fixed shroud |
| 241 | top wall |
| 242 | side walls |
| 243 | bottom wall |
| 244 | steam inlet opening |
| 245 | arrow |
| 246 | steam flowline |
| 247 | holder support bracket |
| 248 | indexing pin |
| 249 | indexing pin |
| 250 | holder |
| 251 | pivot |
| 252 | blade handle |
| 253 | transversely cut fish section |
| 254 | front flat surface |
| 255 | rear flat surface |
| 256 | peripheral surface |
| 257 | perforated plate |
| 258 | openings |

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A method of processing transverse fish slab sections, each having opposing and generally parallel sides and non-edible portions and edible meat portions, comprising the steps of:

a) sectioning a fish body into a plurality of generally transverse fish slab sections;

b) imaging both opposing sides of the fish body section with a camera to produce an image of each side of the fish slab section; and c) cutting the non-edible parts of the fish section with a cutting fluid jet that uses the image of each side of the fish slab section to define a jet cutting path.

2. The method of claim 1 wherein there are a pair of video cameras positioned on opposite sides of the fish slab section during imaging.

3. The method of claim 1 wherein the fish slab section is viewed in step "c" by a pair of video cameras.

4. The method of claim 1 wherein, prior to step "b" the fish slab section is steamed.

5. The method of claim 1 wherein in step "c" the fish slab section is lighted with a diffuse light source to uniformly illuminate each side of the fish slab section.

6. A method of processing transverse fish slab sections, each having opposing and generally parallel sides and non-edible portions and edible meat portions, comprising the steps of:

a) sectioning a fish body into a plurality of generally transverse fish slab sections;

b) preliminarily cooking the fish section;

c) imaging both opposing sides of the fish body section with a video camera to produce an image of each side of the fish slab section;

d) cutting non-edible parts of the fish section with a cutting fluid jet that uses the image of each side of the fish slab section to define a jet cutting path.

7. The method of claim 6 wherein there are a pair of video cameras positioned on opposite sides of the fish slab section during imaging.

8. The method of claim 6 wherein the fish slab section is viewed in step "c" by a pair of video cameras.

9. The method of claim 6 wherein the fish slab section is steamed in step "b".

10. The method of claim 6 wherein step "c" the fish slab section is lighted with a diffuse light source to uniformly illuminate each side of the fish slab section.

11. The method of claim 6 wherein the fish slab section is illuminated in step c with a light source that illuminates the fish slab section at an angle with respect to an opposed surface of fish slab section.

12. A video imaging system for use in processing transversely cut fish slab sections having an edible portion and a non-edible portion, the section including a pair of opposed flat surfaces surrounded by a curved peripheral portion, comprising:
   a) a frame;
   b) a video camera at each end of the frame;
   c) a target area adapted to receive the fish section;
   d) a holder for removably supporting a fish section to be processed in a position that enables one of the cameras to view one flat side of the fish section and the other camera to view the other side of the fish section.

13. The apparatus of claim 12 wherein the frame includes a pair of shrouds that surround the video cameras.

14. The apparatus of claim 12 wherein the holder forms a connection with the fish body section at the peripheral portion.

15. The apparatus of claim 12 wherein the target area is positioned generally between the cameras and equidistant to each camera so that the image generated by each camera is about the same size as the other generated image.

16. The apparatus of claim 12 wherein the frame includes shroud means aligned with the cameras along a longitudinal axis that defines the line of sight between each camera and the fish section to be processed.

17. The apparatus of claim 12 wherein the frame includes a pair of shrouds that are generally opposed and that are aligned with the cameras respectively, and each shroud has a longitudinal axis that defines a line of sight between the cameras and the fish section to be processed.

18. The apparatus of claim 17 wherein the shrouds each have outer wall structures and an inner space with means for illuminating each side of the fish section to be processed contained within the space.

19. The apparatus of claim 18 wherein the illuminating means includes a light source that angularly illuminates each fish section to be processed along a line that forms an acute angle with the line of sight between the video camera and the fish section.

20. The apparatus of claim 12 wherein there is further provided background means for screening behind the fish body section during imaging.

21. The apparatus of claim 20 wherein the background means comprises a pair of background sheets that are movably affixed to the frame so that a selected one of the sheets can be placed behind the fish section surface to be viewed.

22. The apparatus of claim 21 wherein the sheets are pivotally affixed with respect to the frame.

23. The apparatus of claim 22 wherein there is further provided a rotary shaft mounted upon the frame, and a pair of arms extending from the shaft, and the sheets are mounted on the pair of arms.

24. The apparatus of claim 21, further comprising a pair of pressure-actuated cylinders mounted on the frame and a pair of extensible pushrods extending from the pressure-actuated cylinders, and wherein the sheets are mounted on the pushrods.

25. The apparatus of claim 12, further comprising positioning means for moving the holder supporting the fish section to be processed into the position in the target area that enables one of the cameras to view one flat surface and the other camera to view the other flat surface of the fish section.

26. The apparatus of claim 25, wherein the positioning means comprises a pressure-actuated cylinder and an extensible pushrod, the pushrod engaging the holder to push the fish body section supported by the holder into the target area.

27. A video imaging system for use in processing transversely cut fish slab sections having an edible portion and a non-edible portion, the section including a pair of opposed flat surfaces surrounded by a curved peripheral portion, comprising:
   a) a frame having at least one shroud with a hollow bore having a central longitudinal axis;
   b) a light source contained inside the shroud;
   c) a video camera at each end of the frame;
   d) a target area adapted to receive the fish section;
   e) a holder for removably supporting a fish section to be processed in a position that enables one of the cameras to view one flat surface of the fish section and the other camera to view the other flat surface of the fish section.

28. The apparatus of claim 27 wherein the frame includes a pair of shrouds that each surround respectively a video camera.

29. The apparatus of claim 27 wherein the holder forms a connection with the fish body section at the peripheral portion.

30. The apparatus of claim 27 wherein the target area is positioned generally between the cameras and equidistant to each camera so that the image generated by each camera is about the same size as the other generated image.

31. The apparatus of claim 27 wherein the frame includes a pair of shrouds aligned with each of the cameras along a longitudinal axis that defines the line of sight between each camera and the fish section to be processed.

32. The apparatus of claim 27 wherein the frame includes a pair of shrouds that are generally opposed and that are aligned with the cameras, and each shroud has a longitudinal axis that defines a line of sight between the cameras and the fish section to be processed.

33. The apparatus of claim 27 wherein the shrouds have wall structures and an inner space with means for illuminating each side of the fish section to be processed contained within each shroud's inner space.

34. The apparatus of claim 33 wherein the illuminating means includes a light source that angularly illuminates each fish section to be processed along a line that forms an acute angle with the line of sight between the video camera and the fish section.

35. The apparatus of claim 27 wherein there is further provided background screening means for screening behind the fish body section during imaging.

36. The apparatus of claim 35 wherein the background screening means comprises a pair of sheets that are movably affixed to the frame so that a selected one of the sheets can be placed behind the fish section surface to be viewed.

37. The apparatus of claim 36 wherein the sheets are pivotally affixed with respect to the frame.

38. The apparatus of claim 37 wherein there is further provided a rotary shaft mounted upon the frame, and a pair of arms extending from the shaft, and the sheets are mounted on the pair of arms.

39. The apparatus of claim 36 further comprising control means for interchangeably moving the pair of sheets with respect to the fish body section.

40. The apparatus of claim 36, further comprising a pair of pressure-actuated cylinders mounted on the frame and a pair of extensible pushrods extending from the pressure-actuated cylinders, and wherein the sheets are mounted on the pushrods.

41. The apparatus of claim 27, further comprising positioning means for moving the holder supporting the fish section to be processed into the position in the target area that enables one of the cameras to view one flat surface and the other camera to view the other flat surface of the fish section.

42. The apparatus of claim 41, wherein the positioning means comprises a pressure-actuated cylinder and an extensible pushrod, the pushrod engaging the holder to push the fish body section supported by the holder into the target area.

* * * * *